Patented Nov. 8, 1949

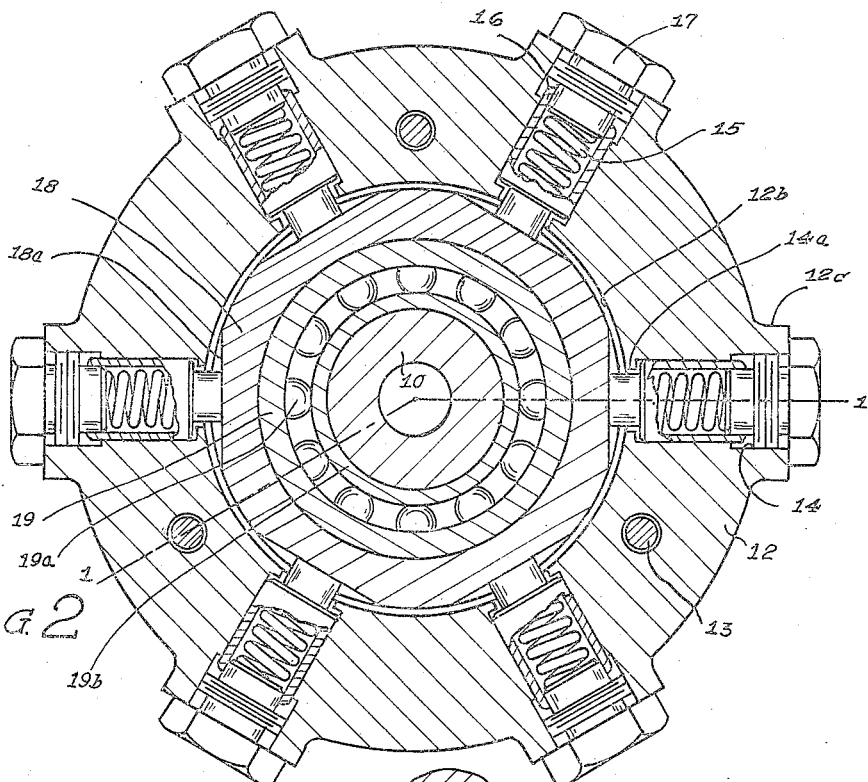
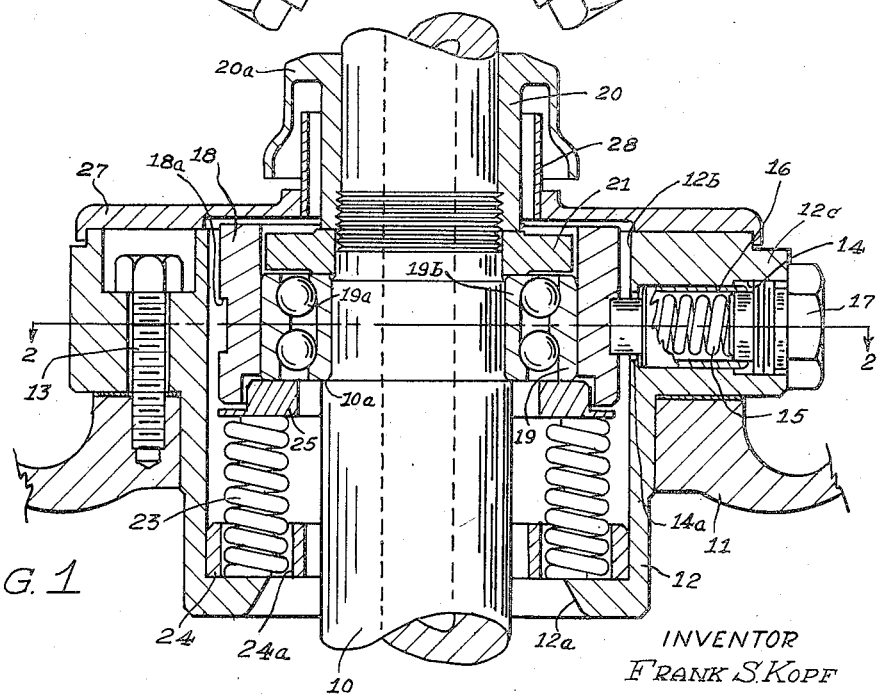

2,487,343

UNITED STATES PATENT OFFICE 2,487,343

BEARING ASSEMBLY FOR CENTRIFUGES
AND THE LIKE

Frank S. Kopf, Poughkeepsie, N. Y., assignor to
The De Laval Separator Company, New York,
N. Y., a corporation of New Jersey Application April 23, 1948, Serial No. 22,734

5 Claims. (Cl. 308—184)

1

This invention relates to spindle bearings for centrifuges, and the like. More particularly, the invention has reference to an improved bearing assembly for resiliently supporting the spindle of the centrifugal bowl so as to accommodate and absorb vibrations incident to its rotation as well as abnormal axial forces encoutnered in operating the centrifuge.

In centrifuges as commonly made heretofore, the spindle supports the centrifugal bowl and, in turn, is supported by both top and bottom bearings. The bottom bearing takes up the axial thrust of the spindle, while the top bearing serves only as a lateral support for the spindle. Since the rotating parts necessarily undergo lateral or radial movements as they are brought up to their designed speed, and even while rotating at the intended speed, the top bearing includes vibration absorbing means arranged radially between the bearing element proper and the stationary frame of the machine. The vibration absorbing means are generally in the form of a rubber cushion or radial compression springs disposed around the bearing element and seated in the stationary frame.

In the operation of some centrifuges, the bearing support for the rotating spindle and bowl is subjected at different times to axial forces considerably greater than that due to the weight of the rotating parts and the contents of the bowl. These additional forces may be due, for example, to the downward thrust of an axial plunger to open discharge valves at the periphery of the bowl, as disclosed in a co-pending application of George J. Strezynski, Serial No. 654,894, filed March 16, 1946. In such instances, the bearing support must be capable of withstanding the additional intermittent axial forces without undue wearing of the parts.

The present invention is directed to the provision of an improved unitary bearing assembly for centrifuge spindles, and the like, which has resilient supports for accommodating both radial and axial movements of the rotating spindle and so arranged as to reduce wearing of the parts due to intermittent abnormal forces, particularly axial thrusts.

A bearing assembly made according to the invention comprises a bearing element proper, such as a ball bearing, having inner and outer races, the inner race engaging and surrounding the spindle and being locked against axial movement relative thereto. The outer race is slidable axially in a surrounding ring which is movable radially in a housing secured to the frame and

2 removable therefrom. Radial movements of the ring are yieldingly opposed by a resilient radial support disposed around the ring between the latter and the side wall or walls of the housing. The radial support may take the form of a rubber-like cushion or a series of radial springs. In addition, the spindle has a yielding axial support, such as a rubber cushion or one or more compression springs, seated on the bottom of the housing. The yielding axial support acts through an overlying axial thrust ring engaging the bottom of the outer race of the bearing and spaced from the inner race, this thrust ring being movable axially relative to the ring having the resilient radial support. Thus, the latter ring can move radially with the bearing and spindle against the centering action of the resilient radial support, such movement being permitted by lateral flexing of the yielding axial support or by horizontal sliding movement on the axial thrust ring, or both; and at the same time the outer race is yieldingly supported in the axial direction and can slide vertically in the surrounding radial support ring so as to accommodate variations in the thrust on the yielding axial support. In the preferred construction, the radial support ring also forms part of a safety bearing for limiting lateral movement of the rotating parts in the event of failure of the bearing element.

For a better understanding of the invention, reference may be had to the accompanying drawing, in which Fig. 1 is a vertical sectional view of part of a centrifuge embodying one form of the invention, showing the spring bearing assembly at the upper portion of the spindle, and Fig. 2 is a sectional view along the line 2—2 of Fig. 1.

Referring to the drawing, the number 10 designates a centrifuge spindle which, at its upper end, supports a centrifugal bowl (not shown). The spindle is rotatable with the bowl in a frame 11 of the centrifuge. A cylindrical housing 12 is removably mounted in a central opening in the frame 11, to which it is secured by bolts 13. The housing 12 has bottom and top openings 12a and 12b, respectively, through which the spindle 10 extends with a clearance. At its upper portion, the housing 12 has an external flange 12c seated on the frame around the opening for the housing. The flange 12c has a series of radial recesses 14 spaced around the spindle axis, each recess containing a radial compression spring 15. Each spring 15 is confined within a plunger 16 slidable radially in the recess. The inward movement of each plunger is limited by a shoulder 14a, the plunger having a reduced portion projecting inwardly beyond the shoulder into the interior of the housing. At its outer end, each spring 15 engages a screw plug 17 closing the outer end of the radial recess.

The springs 15 and their plungers 16 form a yielding radial support for a ring 18 in the upper portion of the housing chamber. In its outer wall, the ring 18 has grooves 18a for receiving the reduced inner ends of the plungers, the grooves as shown being dimensioned to prevent vertical movement of the ring relative to the plungers. The ring 18 closely surrounds a main bearing element comprising an outer race 19, balls 19a, and an inner race 19b. The inner race, in turn, closely surrounds the spindle 10 and is held against a shoulder 10a of the spindle by means of a nut 20.

The nut 20 is screwed on the spindle above the main bearing. A safety bearing in the form of an annular member 21 is interposed between the nut and the main bearing. The member 21 closely surrounds the spindle and is clamped by the nut against the inner race 19b, so that the safety member 21 rotates with the spindle. The outer portion of member 21 is spaced from the top of the outer race 19, and the periphery of member 21 is spaced slightly from the inner wall of ring 18, within which the member 21 is rotatable.

The main bearing 19 and the spindle are supported within the ring 18 by axial thrust springs 23 spaced around the spindle. At their lower ends, the springs 23 are seated on the bottom of housing 12 where they are positioned in holes 24a in the locating ring 24. The ring 24 surrounds the spindle with a clearance to permit radial movements of the spindle. An axial thrust ring 25 is interposed between the upper ends of the springs and the outer race 19 of the main bearing, the ring 25 being spaced from the inner race 19b. As shown, the ring 25 extends loosely into a depending portion of the ring 18 and has a flange underlying the latter ring, thus limiting upward movement of the spindle. Both the ring 25 and the ring 18 are spaced from the inner wall of housing 12 so that the spindle can move radially in the housing.

The top of the housing 12 is closed by a removable cover 27 having a central sleeve 28 extending upwardly around the nut 20 in spaced relation thereto. A skirt 20a on the nut extends downwardly around the sleeve 28 and is spaced therefrom to provide a baffled passage communicating with the interior of the housing for circulation of air.

The operation of the new bearing assembly is as follows. The inward thrust of the radial springs 15, acting through plungers 16, ring 18 and bearing 19, serves to center the spindle in the housing 12. However, lateral movements of the spindle incident to its rotation are yieldingly opposed by the radial springs, which thus act to absorb the radial vibrations. These lateral movements of the bearing and the ring 18 are accommodated by flexing of the upper portions of the thrust springs 23, or by a horizontal sliding action on thrust ring 25, or by both. Axial vibrations of the spindle and the bearing are absorbed by the thrust springs 23 which, through the thrust ring 25, support the bearing and the spindle. Axial movements of the spindle, due to such vibrations or other cause, such as an abnormal downward thrust incident to opening valves in the centrifugal bowl, are accommodated entirely by sliding of the outer race 19 in the ring 18, which occurs when the springs 23 flex axially relative to ring 18. In this way, the vertical movements do not interfere with operation of the yielding radial support, and the radial and axial yielding support systems have a junction formed by the broad frictional contact surfaces of the outer race 19 and the surrounding ring 18.

In the event that the main bearing element should break due to fracture of the balls 19a, excessive lateral movements of the spindle are prevented by engagement of the periphery of the safety member 21 with the inner wall of the surrounding ring 18. It will be observed that in this event the radial springs 15 still function to cushion the lateral movements of the spindle transmitted through the safety member 21, thus preventing damage to the centrifuge.

I claim:

1. In a centrifuge, or the like, having a spindle rotatably mounted in a frame, a bearing assembly for the spindle comprising a housing in the frame, the housing having openings at the top and bottom through which the spindle extends with a clearance, a bearing element in the housing having inner and outer races, the inner race closely surrounding the spindle and being secured against axial movement relative thereto, a ring closely surrounding the outer race and in which the outer race is slidable axially, a yielding radial support engaging the outer surface of the ring and interposed between the ring and the side of the housing, the support acting through the ring and bearing element to center the spindle, and a yielding axial support seated in the housing below the bearing element and axially supporting the spindle and the inner race only through said outer race, said last support being adapted to flex axially relative to the ring.

2. A bearing assembly according to claim 1, comprising also an axial thrust ring interposed between the yielding axial support and the outer race.

3. A bearing assembly according to claim 1, comprising also an axial thrust ring interposed between the yielding axial support and the outer race and extending at least partly into said first ring.

4. A bearing assembly according to claim 1, comprising also an axial thrust ring interposed between the yielding axial support and the outer race and extending at least partly into said first ring, said rings having interengageable parts limiting upward movement of the spindle.

5. A bearing assembly according to claim 1, comprising also an axial thrust ring interposed between the yielding axial support and the outer race and extending into the lower end portion of the first ring, and an annular safety bearing member secured to the spindle in the upper end portion of said first ring, said annular member having a radial clearance between its periphery and the inner wall of the ring.

FRANK S. KOPF.

No references cited.